United States Patent [19]
Brunato

[11] 3,898,061
[45] Aug. 5, 1975

[54] DEGASIFIER FOR DRILLING MUD

[76] Inventor: Siro Brunato, Via Sangregorio Gall 23, 20077 Melegnano, Italy

[22] Filed: Oct. 9, 1973

[21] Appl. No.: 404,155

[30] Foreign Application Priority Data
Mar. 9, 1973 Italy.................................. 21369/73

[52] U.S. Cl.................................... 55/193; 55/206
[51] Int. Cl.².......................................... B01D 19/00
[58] Field of Search............. 55/46, 52, 55, 190–204

[56] References Cited
UNITED STATES PATENTS

| | | | |
|---|---|---|---|
| 2,714,308 | 8/1955 | Heck................................ | 55/199 X |
| 2,869,673 | 1/1959 | Erwin................................... | 55/192 |
| 3,255,576 | 6/1966 | Dawkins............................. | 55/192 |
| 3,271,929 | 9/1966 | Bowden et al....................... | 55/52 |
| 3,303,895 | 2/1967 | Fontenot........................ | 55/191 X |
| 3,358,425 | 12/1967 | Burnham, Sr........................ | 55/193 |

*Primary Examiner*—Samih N. Zaharna
*Assistant Examiner*—Richard W. Burks
*Attorney, Agent, or Firm*—Fulbright & Jaworski

[57] ABSTRACT

A degasifier for drilling mud which mechanically separates the drilling mud for releasing gas under a vacuum and which is particularly useful on offshore drilling rigs. The degasifier includes a container for receiving the mud to be degasified, means are provided in the container for separating the mud for releasing the gas from the mud, and means are connected to the container for applying a vacuum for removing the gas. The means for applying the vacuum include a water line for pumping water from and to the body of water under the drilling rig and is provided with a venturi in the water line for creating a vacuum in the container for removing gas from the container and disposing of the hazardous gas safely in the water. The gas is safely removed from the working area of the drilling rig, and a further gas exhaust may be connected to the container and leading to adjacent the top of the rig for additionally removing gas from the work area. The means for separating the mud may include one or more cyclones in the container adjacent the mud inlet and a plurality of inclined plates for breaking up the mud as it moves by gravity through the container.

2 Claims, 2 Drawing Figures

{ 3,898,061 }

DEGASIFIER FOR DRILLING MUD

BACKGROUND OF THE INVENTION

The present invention relates to a degasifier for drilling mud which separates gas from the mud both mechanically and by vacuum as the mud is returned from the well. While vacuum pumps and mechanical breaking up of the mud have been used in the past to separate gas from the drilling mud, the prior degasifiers have operational problems and in addition created safety problems by withdrawing the explosive gases and other foul vapors from the mud and exhausting them into the working area creating explosive hazards. The present invention is directed to various improvements in a mud degasifier which requires few moving parts, the vacuum is provided by the continuous circulation of water from the usual rig fire fighting equipment, and the gas separated from the mud is disposed of in a safe manner.

SUMMARY

The present invention is directed to a mud degasifier which breaks up the mud-gas emulsion by a combination of mechanical action and vacuum, and safely disposes of the separated gas to a location remote from the working area.

A still further object of the present invention is the provision of an improved mud degasser for use in an offshore drilling rig in which the vacuum is obtained by providing a water ejector or venturi from the continuous flowing water line of the fire fighting equipment thereby avoiding the need for a separate vacuum pump as well as safely removing the gas from the working area by disposing of the separated gas into the water.

Still a further object of the present invention is the removal of the separated gas from the degasser away from the rig working area by a line extending to a position above the working area.

Yet a still further object of the present invention is the provision of a vacuum degasifier for separating gas from mud in which the mechanical means for breaking up and separating the mud includes one or more cyclones in the degasifier for receiving the mud and a plurality of inclined plates for breaking up in mud-gas emulsion as the mud flows through the container by gravity.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 2:
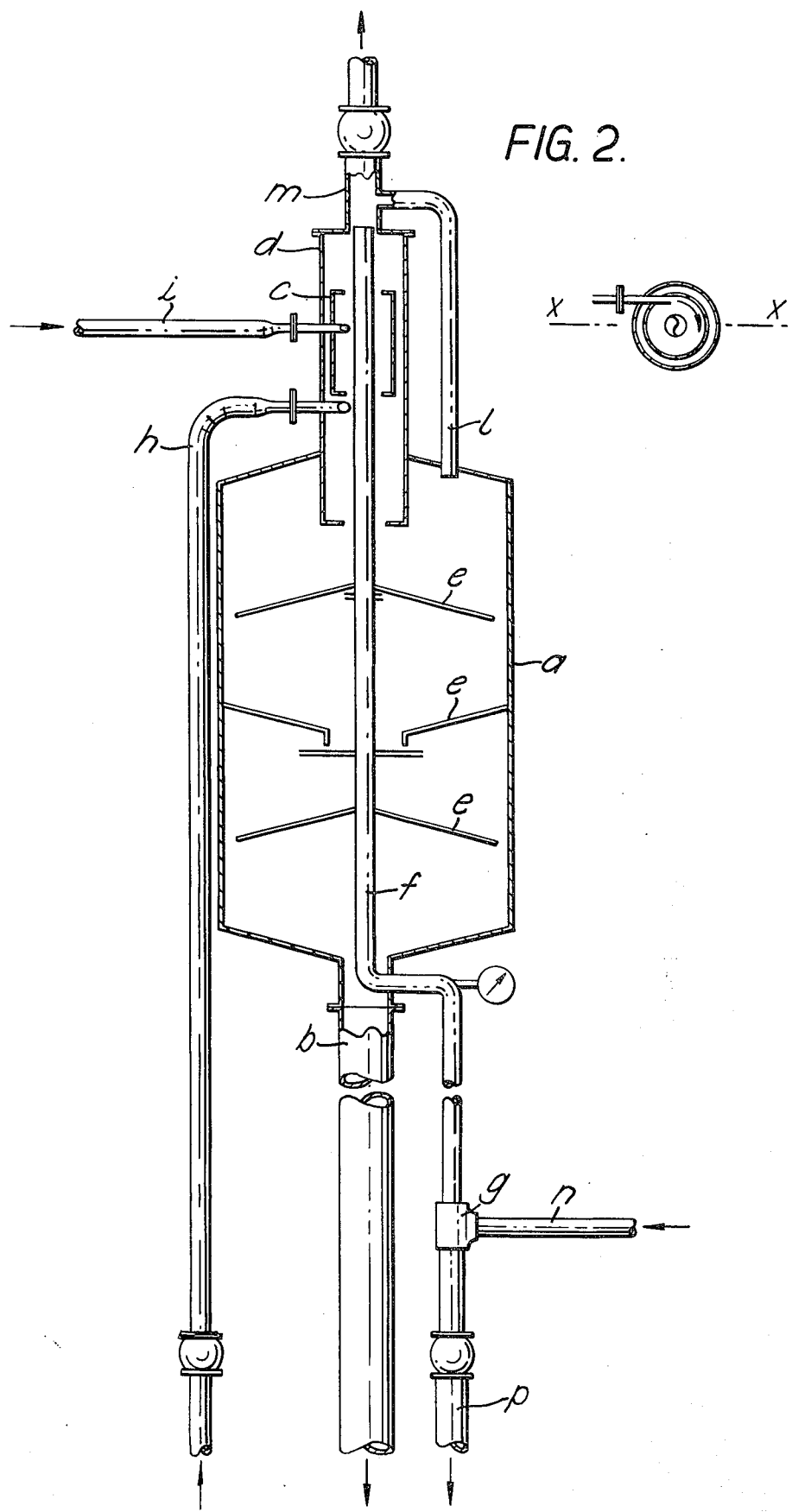
FIG. 2 is an enlarged elevational view, partly in cross section, of the degasser of FIG. 1, and includes a cross-sectional view across one of the mud inlets.

Referring now to the drawings, and particularly FIG. 2, the mud degasser of the present invention includes a container, preferably cylindrical, having a mud outlet $b$ for discharge of the treated mud and one or more mud inlets $h$ and $i$ adjacent the top of the container $a$. Cyclones $c$ and $d$ are positioned to receive the mud tangentially from the inlets $i$ and $h$, respectively, for performing an initial centrifuging and breaking up of the mud-gas emulsion for separating the gas from the mud. A plurality of inclined plates $e$ are positioned inside the container $a$ for receiving the mud as it flows through the container $a$ by gravity and further separating and breaking up the mud-gas emulsion. A tubular connection $l$ acts as a bypass for gas to a gas pipe $m$.

A pipe $f$ is provided in communication with the interior of the container $a$ and includes a plurality of gas openings for drawing off separated gas from the container $a$. Offshore drilling rigs generally includes a fire fighting system having a continuous circulation of water from and to the sea in which the drilling rig is positioned. The sea water flows into line $n$ and out of line $p$. A water ejector or venturi $g$ is placed in the water line and connected to the container through line $f$ to provide a vacuum in the line $f$ for withdrawing the released gases from the container $a$. The vacuum created by the venturi or ejector $g$ provides a high vacuum which will remove practically all of the gases in the container $a$.

Figure 1:
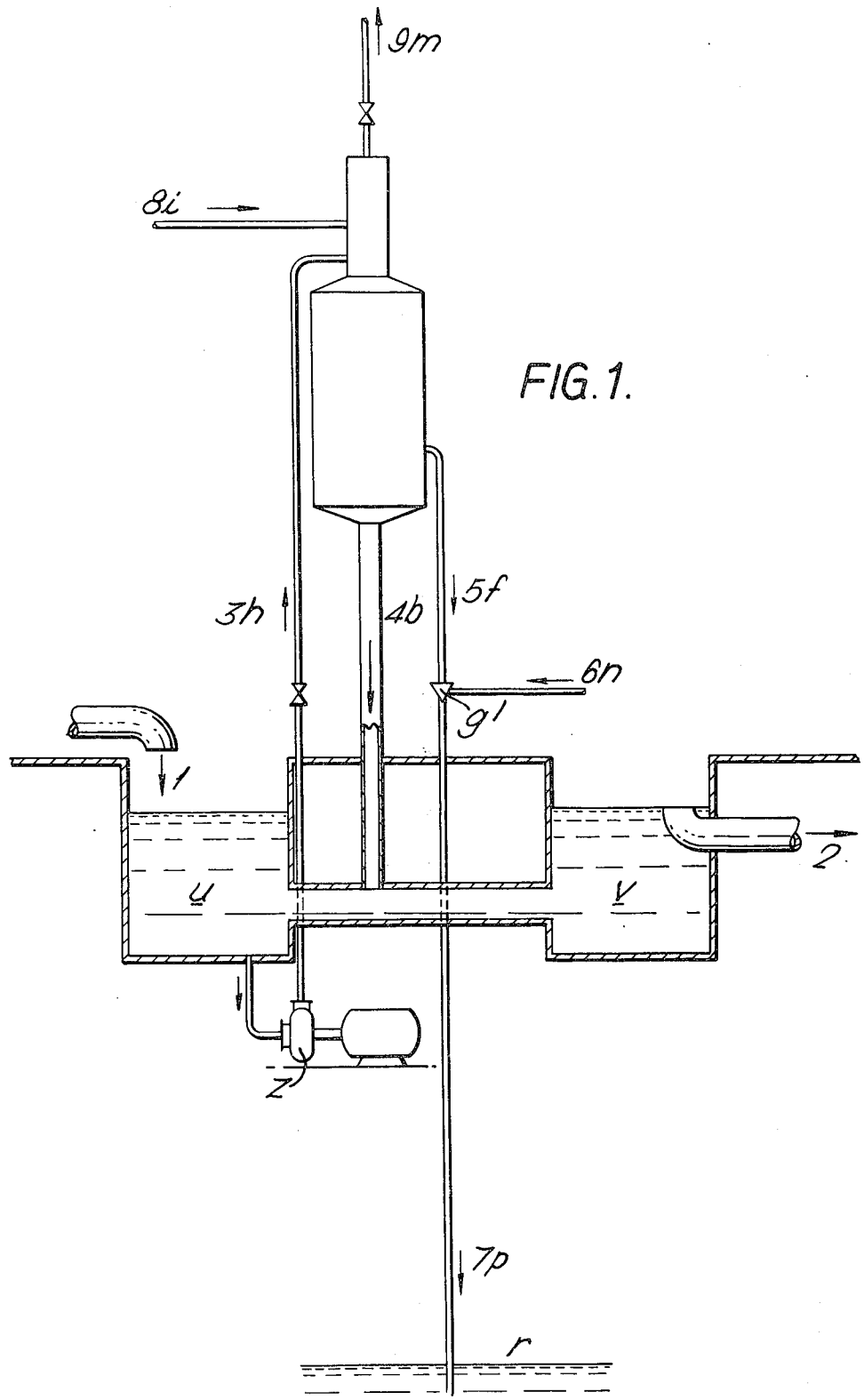
FIG. 1 is an elevational schematic view, partly in cross section, illustrating the mud degasser of the present invention.

Referring now to FIG. 1, the return mud from the well may flow through a flow line or path 1 and conveyed out through a flow line or flow path 2 to the mud collecting tank through two decanting or settling chambers $u$ and $v$ which are interconnected. If the returning mud from the well flowing into chamber $u$ contains gas, it may be pumped through the degasifier by means of a centrifugal pump $z$ and along the flow line $3h$.

In the degasification treatment that follows, the mud which has been separated from the gas in the container $a$ drops by gravity along the flow line $4b$ into the tube or pipe connecting the two chambers $u$ and $v$ while the gases that have been liberated is drawn through the line $5f$ by the ejector or venturi $g'$ operated by water system from the flow line $6n$ and is discharged together with the water along the flow line $7p$ submerged below sea level $r$ thereby removing the explosive and/or corrosive gases from the operating level of the drilling rig. If on the other hand, the mud returning from the well is extremely highly gasified, it may be passed straight to the degasifier container $a$ along the flow line $8i$ by the conventional pressure control choke manifold of the well.

Referring to both FIGS. 1 and 2, an upper gas discharge $9m$ and $m$ may be extended above the rig working level for exhausting the gas at a safe height into the atmosphere. If it is not desired to use the water ejector $g$, the gas may be disposed of through the lines $m$ and $9m$, for example, when the concentration of gas in the mud is minimal or in the event there is a discharge of dry gas from the well which is directed through flow line $8i$ and discharged straight into the atmosphere.

The ejector or venturi $g$ operating with the water under pressure of the fire fighting system, with which each drilling rig is provided, draws in the gases from the container $a$ that have been liberated and collected at various appropriate points inside the container $a$ through the pipe $f$ and expels them mixed with water through the pipe $p$ which is submerged below sea level $r$. The use of the ejector or venturi $g$, as compared with the use of a conventional vacuum pump, simplifies the apparatus in question, produces a reliable operation, and creates a high degree of vacuum, which has the advantage of extracting a larger volume of gas.

The degasifier of the present invention is designed in such a way that the typical mud-gas emulsion is broken up and separated by the action of the combined vacuum created by the water ejector $g'$, the centrifuging action in which the emulsified mud undergoes as it enters the cyclones $c$ or $d$, and the mechanical stirring derived by the inversion of flow created by the inclined plates $e$.

The degasifier of the present invention is simple and reliable in operation and provides for operational safety of the working area of the drilling rig by removing the separated gas either or both of above and below the working area which is of particular importance in the case of explosive gas or gases having other undesired constituents such as hydrogen sulfide which is heavier than air.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A degasifier for drilling mud for use on an offshore drilling rig drilling a well above the sea and including a sea water line and pump means for pumping sea water to and from the drilling rig comprising,
    a mud collecting tank connected to the gasified mud returning from the well,
    a container for receiving the mud to be degasified and positioned above the mud collecting tank,
    a mud inlet adjacent the top of the container,
    a pump connected between the mud inlet and the mud collecting tank for pumping gasified mud into the container,
    a plurality of inclined plates in the container below the mud inlet,
    a mud outlet adjacent the bottom of the container for discharging degasified mud by gravity,
    a clean mud tank positioned below and connected to the mud outlet for receiving clean mud from the container,
    means connected to the container for applying a vacuum to the container for removing gas including a venturi in the drilling rig sea water line and connected to the container for removing gas from the container and disposing of the gas in the sea,
    a second mud inlet adjacent the top of the container and connected directly to the well for receiving highly gasified mud, and
    a gas exhaust connected to the container and leading to adjacent the top of the drilling rig for removing gas.

2. A degasifier for drilling mud for use on a drilling rig drilling a well positioned above a body of water, said well having a choke manifold, comprising,
    a mud collecting tank connected to the gasified mud returning from the well,
    a container for receiving the mud to be degasified and positioned above the mud collecting tank,
    a first mud inlet adjacent the top of the container,
    a pump connected between the first mud inlet and the mud collecting tank for pumping gasified mud into the container,
    a second mud inlet adjacent the top of the container and connected to the choke manifold,
    a plurality of inclined plates in the container below the mud inlet,
    a mud outlet adjacent the bottom of the container for discharging degasified mud by gravity,
    a clean mud tank positioned below and connected to the mud outlet for receiving clean mud by gravity from the container,
    means connected to the container for applying a vacuum to the container for removing gas including,
        means including a water line for pumping water from and to the body of water,
        a venturi in the water line and connected to the container for removing gas from the container and disposing of the gas in the water.

* * * * *